Nov. 2, 1926.
H. T. REID
1,605,375
METHOD AND APPARATUS FOR MAKING SALT
Filed Feb. 19, 1924
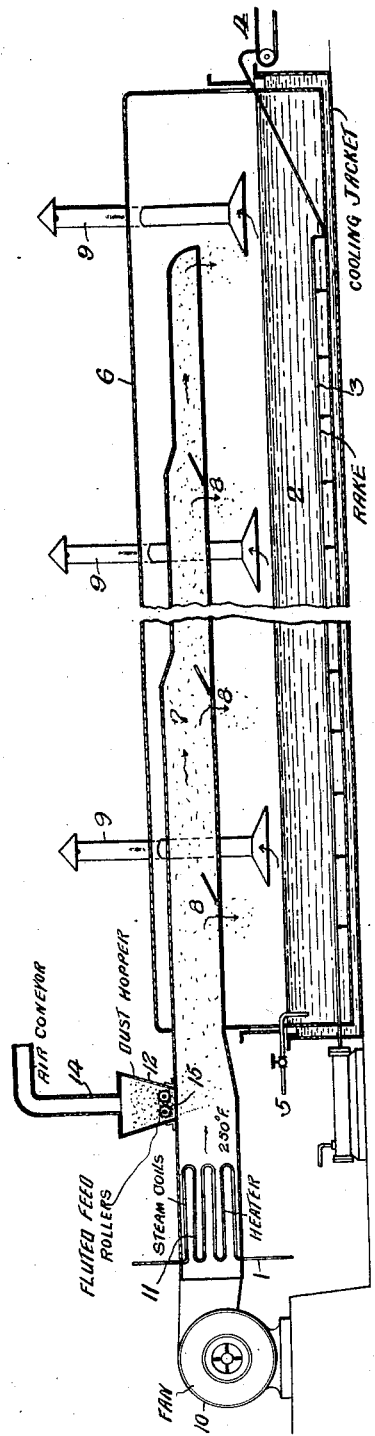
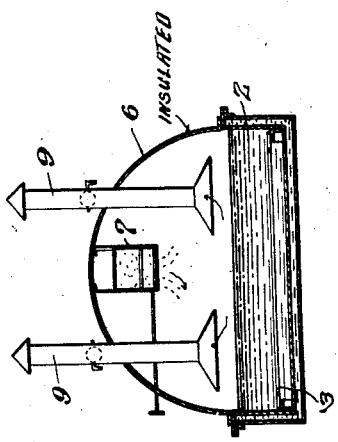
Inventor.
H. T. Reid.
By Fisher, Moser and Moore
Attys.

Patented Nov. 2, 1926.

1,605,375

UNITED STATES PATENT OFFICE.

HUGH T. REID, OF CLEVELAND, OHIO.

METHOD AND APPARATUS FOR MAKING SALT.

Application filed February 19, 1924. Serial No. 693,794.

My invention relates to a method and apparatus for making salt, and my general object is to provide an efficient method and apparatus for producing grainer salt hygroscopically, all as hereinafter shown and described and more particularly pointed out in the claims.

Thus, referring to the drawing accompanying this application, Fig. 1 therein exemplifies a preferred form of apparatus which may be used in practicing my method. This view is largely a sectional view longitudinally of the apparatus on a greatly reduced scale, and Fig. 2 is a cross sectional view thereof.

The apparatus comprises an evaporating pan 2 which may be one hundred to one hundred and fifty feet in length, twelve to eighteen feet wide, and approximately two feet deep. A suitable power-operated salt raking device 3 may be installed within the bottom of this pan or tank to feed and discharge the finished product out of one end thereof directly to an endless conveyor 4 which carries the salt to some distant point to be dried. The salt solution may be pumped into the pan through a pipe 5 and a substantially constant level may be maintained during evaporating or vaporizing operations. Heretofore, the usual practice has been to evaporate the solution by direct heat applied beneath the pan or by heating coils or other elements submerged within the solution, but in my present method I propose to keep the pan cool and to maintain the body of the solution beneath the top thereof at the lowest temperature possible, while applying hot air uniformly to the top surface of the solution within a covered pan. Thus, a cover 6 encloses the entire top and ends of the pan and the hot air is introduced at uniformly spaced intervals into the covered space above the solution through a graduated pipe or air conveying passage 7 extending lengthwise of the pan and having a series of damper outlets 8 at its bottom situated above and in close proximity to the solution. A series of air discharge ducts or pipes 9 are vertically arranged at spaced intervals within cover 6, the lower ends of which may be open and of flaring shape and supported in close proximity to the top of the pan or the solution therein. A fan or blower 10 at the intake end of the air distributing pipe or passage 7 supplies air in the desired quantity, which air is heated to a high temperature by a suitable furnace or other heater located outside of the pan. In the present drawing the air heater is shown diagrammatically as comprising steam coils 11 located within pipe or passage 7 at the discharge side of fan 10, but when a direct heat furnace is used it may be connected to the suction side of the fan. A hopper 12 or branch pipe 14 is openly connected with the hot air passage 7 to permit dust salt to be delivered in any desired quantities to the current of hot air passing through passage 7 on its way to the evaporating chamber, and a pair of feed rollers 15, either fluted or having feed pockets, may be used at the discharge mouth of the hopper to regulate the charge of dust salt according to any given condition. My purpose in utilizing this finely powdered salt is two-fold, first, to supply a salt nucleus for advancing and hastening graining operations, and second, to utilize with profit the dust salt derived from refining operations or from grinding and crushing mills in a rock salt or evaporating plant, and which dust salt has heretofore been either a waste product or expensive to recover.

The amount of salt in a solution, commonly called a brine, varies in different localities from 70% to 100% salimeter test. The solution or brine usually carries calcium carbonate and other impurities, and a usual preliminary in salt making is to precipitate as much of the impurities as possible by preheating or by treating the brine with soda ash, tri-sodium phosphate, etc., or both. This brine is admitted to the evaporating pans at a temperature very near that which is maintained in the pan, and in doing so no unnecessary circulation is created in the pans by the admission of the brine.

Assuming the brine to be treated is free from impurities before any salt making occurs, the excess water must be evaporated or rather vaporized and the solution brought down to the concentration point. Heretofore, the heat to effect evaporation has been applied to the brine by steam coils placed midway between the brine level and the bottom of the pan, and a circulation created, the warmer brine rising to the top of the pan. As the warm brine comes in contact with the layer of air adjacent the top surface of the brine it warms this air. This air may or may not be at the saturation point but on increasing its temperature the moisture carrying capacity is increased and the air picks up the water. As the air is heated it expands and tends to rise setting up a circulation in the air above the brine, the circulation in both cases varying directly with the temperature carried in the brine by the steam coils. Eventually, fine salt begins to appear on the surface of the brine and by examining this salt closely it will be found that the upper surface of the salt is dry. This creates a surface tension which tends to hold the grain in suspension. As evaporation proceeds these grains grow by accretion and by the knitting together of the separate particles of salt as the water content is removed. A crust is formed and the upward circulation in the brine tends to keep the crust in suspension. As this crust grows and covers the surface more and more, it follows that less and less of the brine surface is exposed to the air, and gradually the heat content of the brine builds up, providing no means is provided for cutting the crust. Otherwise, the crust will cover the whole evaporating surface, and no further salt making will ensue until the brine has reached the boiling point. But upon reaching the boiling point, the resultant ebullition will break the crust and making of salt may proceed but in an erratic way and with a great variation in grain. Grease and oil are frequently used to cut the crust, but assume the evaporation of the brine proceeds at a lower temperature and without any grease, oil or other means for cutting the crust, a crust will form in spots and gather weight and sink to the bottom. In other words as the salt forms it will soon reach the point where its weight counteracts the upward circulation of the brine, and it falls or is precipitated to the bottom. In passing downwardly through the brine below the steam coils the precipitated salt liberates further salt by its heat transfer which tends to increase the size of the crystal, providing the brine is cooler at that point than the salt formation. The colder the brine the more this action occurs and the stronger, coarser and more distinct is the grain; consequently where the brine is heated internally or from below, the operation of graining proceeds at a very low efficiency. The primary purpose in all these operations is to make a coarse grain. The coarser grain product is used extensively by butter and cheese makers and others, and commands a higher price because it is slower and more expensive to produce than fine grained salt.

In order to overcome the losses and to gain efficiency and cheapen the making of coarse grain salt and to control the grain of salt made, I have devised the present method and apparatus for making salt, which in practice omits the heating coils in the pan and consists in applying hot air at a high temperature to the exposed top surface of the solution. Thus in practicing my method the air is heated by a heater, such as a steam heater 11, and forced by a fan or blower 10 through the graduated passage 7 and evenly distributed within the evaporating chamber by way of the damper outlets 8. The cover 6 for the pan may be insulated to avoid heat losses and to promote the holding of an even temperature inside the hood or cover over the brine surface. The escape of the moisture laden air may be regulated to a quiet outflow by the size or number of discharge ducts 9 used in a given apparatus, or by valves in said discharge ducts. It is desirable to reduce the rate of flow of the hot air so as not to ripple the brine surface. The minimum temperature of the air as it enters the evaporator may be 250° F., or at the requisite temperature for any given installation so that the air on leaving will be approximately 200° F. or higher. Air at approximately 202° F. has a carrying capacity of about seventy times as much vapor as at 102° F., or about twenty-five times as much as at 132° F., the latter temperature representing the maximum temperature of the air heated by convection from the body of an internally heated solution. From this it can be readily seen that to apply air heated to the high temperature according to my hygroscopic method will remove a much larger percentage of water more quickly and efficiently from the salt solution than in the common methods described.

Moreover, in practicing my method the body of the brine in the pan remains at a minimum temperature, preferably as cool as possible. That is, the hot air is applied evenly over the surface of the brine so that only the brine exposed to the hot air will be highly heated and no appreciable upward circulation created as occurs in treating the body of the liquid at its bottom or internally, thus maintaining a quiescent and cooler condition of the brine which is more conducive to the rapid formation and precipitation of the salt crystals. As the water in the brine evaporates a fine salt is formed and the knitting action of the crystals is exceedingly rapid. This tends to build up a salt crystal which is exceedingly compact and excludes most of the water content. As the crystal grows it soon reaches the point where its weight counteracts the surface tension and the crystals sink slowly to the bottom. In descending the crystals pass through zones of cooler brine and the heat in the crystal liberates more salt which is accreted and builds up the crystal, and because of the absence of excessive warm regions in these lower zones the crystal has no tendency to soften but continues to grow in strength and size as it approaches the bottom. Therefore, the product of my method is very superior to that of other know methods, and it is not as susceptible to breakage but will withstand the rough handling necessary in subsequent refining and packing operations, and other benefits and savings are also effected in consequence.

In practicing my method the rate of evaporation can be controlled by varying the temperature of the air, for example, by raising it, or by keeping a constant temperature and varying the volume of air, either step giving accurate control of the size and character of the grain of salt. By uniformly distributing the hot air within the closed pan, an even temperature and even rate of vaporization my be maintained over the entire surface of the brine. An uneven rate of vaporization would make the product very erratic or of varying composition.

My method also eliminates the tendency of the brine to crust over, thereby maintaining uniform graining of the salt and permitting all the heat to be applied advantageously to the vaporization of the liquid without heating up the entire body of brine. Furthermore, inasmuch as the air is heated above 200° F. the air passing into the evaporating chamber is more or less purified and dried so that there is no contamination of the brine. The cover also provides a means for protecting the brine and keeping it clean, and in operating as described, the atmospheric conditions outside will not affect the operation within the evaporator. The resultant product is a coarse grained flaky salt.

To obtain further benefits and advantages and an increased efficiency in operations, I may take the following steps in addition to the foregoing, consisting in charging the hot air with salt dust and distributing the charge uniformly by means of the air over the surface of the brine within the covered pan. The average plant, whether it be a rock salt or an evaporating plant, accumulates a considerable amount of dust salt from refining operations or from the grinding and crushing mills. Heretofore this dust salt has been a waste and loss, but I utilize the same to hasten graining and to increase the character and size of the grain. Thus the dust salt may be conveyed to hopper 12 by way of air pipe 14 and fed into the hot air passage 7 by rollers 15, and the amount of dust salt commingled with the hot air may vary according to the rate at which the vaporization of the brine is being carried on in the pan. The particles of salt dust are first heated by contact with the flowing hot air, and then distributed uniformly with the hot air over the surface of the brine and deposited upon such surface, and the heat within the salt dust tends to liberate the water content and promote accretion and the graining action occurring in the brine. The salt dust forms a nucleus for rapidly building up and forming the salt grains, and the heat content of the dust is utilized together with the surrounding hot air to convert the water at the surface of the brine into vapor and to build up the salt grains by accretion. In settling through the cooler zones the grains harden and strengthen, and I may in some instances employ cooling coils within the pan, or jacket the pan for the circulation of a cooling medium, to maintain the brine in the lower portion of the pan in a uniformly cool condition.

What I regard as my invention and desire to claim, is:

1. A method of making salt, consisting in maintaining a large body of salt solution at a fixed level and in heating the top surface of said solution uniformly with hot air without causing ebullition or agitation of the solution either at or beneath said surface.

2. A method of making salt, consisting in maintaining a salt solution in a comparatively quiescent condition and cool state within a closure, while producing rapid evaporation of its water content by the application of hot air to the top surface of the solution without causing agitation thereof.

3. A method of making salt, consisting in maintaining a substantially constant level of salt solution under confinement while applying hot air uniformly to the top surface of the solution and concurrently keeping the body of the solution beneath the top thereof quiescent and at a lower temperature.

4. A method of making salt, consisting in applying hot air at a temperature of 250° F. or higher uniformly to the top surface of a salt solution without agitating the said surface while maintaining the solution beneath the top surface thereof at the minimum lower temperature without ebullition or circulation.

5. A method of making salt, consisting in applying hot air charged with very fine dust salt to the top surface of a salt solution which is kept cool in part.

6. A method of making salt, consisting in distributing dust salt uniformly to the top surface of a salt solution and in heating the top surface of the solution.

7. A method of making salt, consisting in heating dust salt and depositing the same upon the surface of a salt solution contained within an enclosure while rapidly evaporating the solution.

8. A method of making salt, comprising the step of passing air heated to a temperature above 200° F. and charged with dust salt into a body of a salt solution maintained at a lower temperature.

9. A method of making salt, consisting in heating air to a high temperature and bringing the same together with dust salt into direct contact with the top surface of a body of brine and in discharging the moisture-laden air from above said surface.

10. An apparatus for making salt comprising a covered evaporating pan having a plurality of air intakes and outlets at spaced intervals lengthwise thereof in combination with means adapted to pass heated air in large volume through said intakes at spaced places within the top of said pan and out of said outlets.

In testimony whereof I affix my signature.
HUGH T. REID.